US010354178B2

(12) United States Patent
Linkesch et al.

(10) Patent No.: US 10,354,178 B2
(45) Date of Patent: *Jul. 16, 2019

(54) PALLET MESH NETWORK

(71) Applicant: PALLETECHNOLOGY, INC., San Francisco, CA (US)

(72) Inventors: Richard Linkesch, San Francisco, CA (US); Anthony John Wainman, San Francisco, CA (US)

(73) Assignee: PALLETECHNOLOGY, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,360

(22) Filed: Nov. 27, 2017

(65) Prior Publication Data
US 2018/0089550 A1    Mar. 29, 2018

Related U.S. Application Data

(63) Continuation of application No. 15/270,690, filed on Sep. 20, 2016, now Pat. No. 9,858,523.
(Continued)

(51) Int. Cl.
*H04B 1/40* (2015.01)
*H04W 12/08* (2009.01)
(Continued)

(52) U.S. Cl.
CPC . *G06K 19/07722* (2013.01); *G06K 19/07749* (2013.01); *H04B 1/40* (2013.01);
(Continued)

(58) Field of Classification Search
None
See application file for complete search history.

(56) References Cited

U.S. PATENT DOCUMENTS 6,163,260 A * 12/2000 Conwell .......... G06K 19/07749
340/572.1
9,679,237 B2    6/2017 Linkesch et al.
(Continued)

FOREIGN PATENT DOCUMENTS

SU           36904 A1    5/1934
SU         1668215 A1    8/1991
(Continued)

OTHER PUBLICATIONS

U.S. Appl. No. 15/207,060, U.S. Pat. No. 9,679,237, filed Jul. 11, 2016, Board Embedded With Electronic Device.
(Continued)

*Primary Examiner* — David Bilodeau
(74) *Attorney, Agent, or Firm* — Schwegman Lundberg & Woessner, P.A.

(57) ABSTRACT

The disclosed technology addresses the need in the art for a pallet embedded with an electronic device to track and manage items during shipping. Such an electronic device can receive and store shipment information associated with a pallet associated with the electronic device and/or a nearby pallet. The shipment information can include an identifier associated with the pallet. The electronic device can then attempt a connection on a first wireless interface such as a low power and short range interface. If the electronic device determines that the first wireless interface is inappropriate for a connection, it can try a second wireless interface (such as a higher power and long range interface). The electronic device can then connect on the second wireless interface and send the shipment information.

20 Claims, 4 Drawing Sheets

Related U.S. Application Data

(60) Provisional application No. 62/222,129, filed on Sep. 22, 2015.

(51) Int. Cl.

| | | |
|---|---|---|
| *G06K 19/077* | (2006.01) | |
| *H04W 76/11* | (2018.01) | |
| *H04W 36/30* | (2009.01) | |
| *H04W 52/02* | (2009.01) | |
| *H04B 1/38* | (2015.01) | |
| *H04W 4/80* | (2018.01) | |

(52) U.S. Cl.
CPC .......... *H04W 12/08* (2013.01); *H04W 36/30* (2013.01); *H04W 52/0241* (2013.01); *H04W 52/0254* (2013.01); *H04W 76/11* (2018.02); *H04B 1/38* (2013.01); *H04W 4/80* (2018.02); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/22* (2018.01)

(56) References Cited

U.S. PATENT DOCUMENTS

| | | | |
|---|---|---|---|
| 9,858,523 B2 | 1/2018 | Linkesch et al. | |
| 2002/0036237 A1* | 3/2002 | Atherton | G06K 19/073 235/492 |
| 2003/0163287 A1 | 8/2003 | Vock | |
| 2006/0187057 A1* | 8/2006 | Yang | B31D 1/027 340/572.8 |
| 2006/0261938 A1 | 11/2006 | Lai et al. | |
| 2007/0008120 A1* | 1/2007 | Smith | G06K 7/10108 340/539.26 |
| 2008/0114487 A1* | 5/2008 | Schuler | G06Q 10/06 700/217 |
| 2009/0040024 A1* | 2/2009 | Boubtane | G01D 3/00 340/10.1 |
| 2009/0314829 A1* | 12/2009 | McAllistor | G06K 7/0095 235/375 |
| 2010/0001848 A1 | 1/2010 | Mcallister et al. | |
| 2010/0007470 A1* | 1/2010 | Twitchell, Jr. | G06Q 10/08 340/10.1 |
| 2011/0068924 A1 | 3/2011 | Muirhead | |
| 2012/0239493 A1 | 9/2012 | Zughaib et al. | |
| 2014/0076731 A1* | 3/2014 | Russell-Clarke | H01Q 1/40 205/118 |
| 2017/0083807 A1* | 3/2017 | Linkesch | G06K 19/07722 |
| 2017/0085291 A1 | 3/2017 | Linkesch et al. | |
| 2017/0243103 A1 | 8/2017 | Linkesch et al. | |

FOREIGN PATENT DOCUMENTS

| | | |
|---|---|---|
| WO | WO-2008091628 A1 | 7/2008 |
| WO | WO-2017053471 A1 | 3/2017 |

OTHER PUBLICATIONS

U.S. Appl. No. 15/593,212, filed May 11, 2017, Board Embedded With Electronic Device.

U.S. Appl. No. 15/270,690, U.S. Pat. No. 9,858,523, filed Sep. 20, 2016, Pallet Mesh Network.

"U.S. Appl. No. 15/207,060, Non Final Office Action dated Sep. 15, 2016", 9 pgs.

"U.S. Appl. No. 15/207,060, Notice of Allowance dated Feb. 8, 2017", 8 pgs.

"U.S. Appl. No. 15/207,060, Response filed Dec. 14, 2016 to Non-Final Office Action dated Sep. 15, 2016", 11 pgs.

"U.S. Appl. No. 15/270,690, Non Final Office Action dated Apr. 28, 2017", 9 pgs.

"U.S. Appl. No. 15/270,690, Non Final Office Action dated Oct. 31, 2016", 9 pgs.

"U.S. Appl. No. 15/270,690, Notice of Allowance dated Aug. 29, 2017", 5 pgs.

"U.S. Appl. No. 15/270,690, Response filed Jul. 19, 2017 to Non Final Office Action dated Apr. 28, 2017", 12 pgs.

"U.S. Appl. No. 15/270,690, Response filed Feb. 28, 2017 to Non-Final Office Action dated Oct. 31, 2016", 9 pgs.

"U.S. Appl. No. 15/593,212, Non Final Office Action dated Oct. 26, 2017", 10 pgs.

"International Application Serial No. PCT/US2016/052944, international Preliminary Report on Patentability dated Apr. 5, 2018", 7 pgs.

"International Application Serial No. PCT/US2016/052944, International Search Report dated Jan. 19, 2017", 2 pgs.

"International Application Serial No. PCT/US2016/052944, Written Opinion dated Jan. 19, 2017", 5 pgs.

\* cited by examiner

PALLET MESH NETWORK

CROSS REFERENCE TO RELATED APPLICATIONS

This application is a continuation of, and claims benefit of U.S. patent application Ser. No. 15/270,690, filed on Sep. 20, 2016, which claims the benefit of U.S. provisional application No. 62/222,129, filed on Sep. 22, 2015, both which are expressly incorporated by reference herein in their entireties.

TECHNICAL FIELD

The present technology pertains to utilizing electronic devices to track and monitor objects, and more specifically pertains to a pallet mesh network (or any other mid-sized supply chain asset mesh network) to track and monitor objects during shipping and/or storing.

BACKGROUND

Shipping crates and shipping pallets are widely used to distribute items worldwide. For example, it is estimated that in the US alone, over 500 million shipping pallets are manufactured each year and 1.8-1.9 billion pallets are currently in use. About 100 million plastic macro bins, about 80 million kegs, and several other assets are active in the US economy. One common issue with distributing items is tracking and monitoring the items as they travel from one location to another. For example, identifying each pallet and cargo that sits on top of it when it departs and/or arrives at a location, as well as entering this data into a system is labor intensive and time consuming. Current systems use passive electronic devices, such as a passive Radio Frequency Identification (RFID) device, however use of passive electronic devices have some drawbacks. For example, to utilize a passive RFID device a proper infrastructure must be established at each shipping location to power and read the RFID device, which can cost, for example up to $50,000 for an RFID gate. Further, passive RFID devices provide only limited functionality and cannot communicate with other RFID devices to share data, gather data or enforce data policies to control the data that is shared with an RFID device reader. Accordingly, improvements are needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a pallet (or any other supply chain asset) mesh network to track and monitor objects during shipping and/or storing. Boards embedded with electronic devices can be used to create shipping containers, such as pallets and shipping crates. The embedded electronic devices can receive and store shipment information associated with a pallet from a nearby pallet and can be associated with a cargo that sits on top of it. The shipment information can include an identifier associated with the pallet. The electronic device can attempt a connection on a first wireless interface such as a low power and short range interface. If the electronic device determines that the first wireless interface is inappropriate for a connection, it can try a second wireless interface (such as a higher power and long range interface). The electronic device can then connect on the second wireless interface and send the shipment information.

In some embodiments, an event can wake the electronic device up from a low power mode. The electronic device can then log the event as shipment information and attempt to communicate the shipment information to another device such as a central server. Multiple electronic devices in close proximity can communicate and form a mesh network or structured network.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a pallet mesh network to track and monitor objects during shipping and/or storing. Boards embedded with electronic devices can be used to create shipping containers, such as pallets and shipping crates. The embedded electronic devices can receive and store shipment information associated with a pallet from a nearby pallet and can be associated with a cargo that sits on top of it. The shipment information can include an identifier associated with the pallet. The electronic device can attempt a connection on a first wireless interface such as a low power and short range interface. If the electronic device determines that the first wireless interface is inappropriate for a connection, it can try a second wireless interface (such as a higher power and long range interface). The electronic device can then connect on the second wireless interface and send the shipment information.

In some embodiments, an event can wake the electronic device up from a low power mode. The electronic device can then log the event as shipment information and attempt to communicate the shipment information to another device such as a central service. Multiple electronic devices in close proximity can communicate and form a mesh network or structured network.

Figure 1:
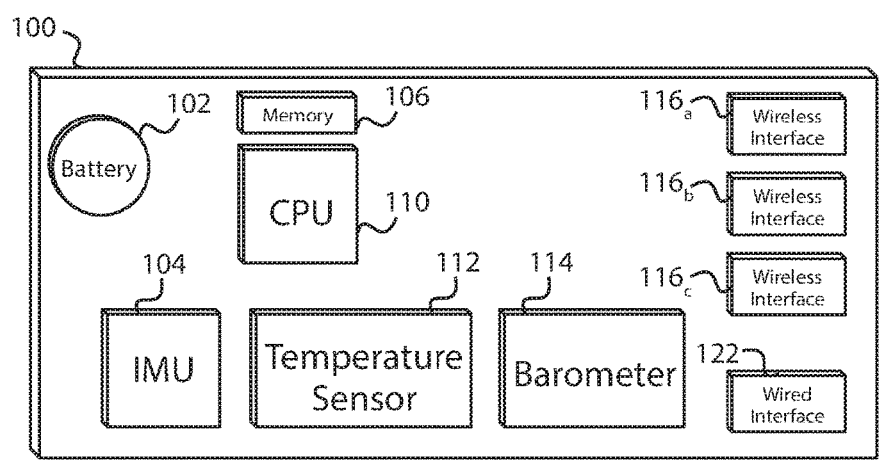
FIG. 1 shows an example electronic device.

FIG. 1 shows electronic device 100 according to some embodiments. Electronic device 100 can be designed to be embedded in a shipping container such as a pallet. As used herein, "shipping container" can include any container or article used for the transport of items, including, for example, a pallet, intermodal container, box, shipping label, merchandise tag, merchandise, etc. Electronic device 100 can have RFID capabilities and can be used for identifying, tracking, monitoring, securing, etc. the respective pallet. Electronic device 100 can be durable such that it can withstand various environments (e.g., extreme temperatures, pressures, humidity levels, mechanical damage) without problems. In some embodiments, electronic device 100 can be embedded within a plastic (or similar) pallet or within a cavity carved out of a section of wood for a wooden pallet. Alternatively, electronic device 100 can be embedded within an enclosed cavity of a board comprising multiple laminated layers of cellulose material. It should be understood that any reference to a "pallet" herein can be equally applicable to intermodal containers, boxes, shipping labels, merchandise tags, merchandise, or any other type of shipping container.

Electronic device 100 can have a power source such as battery 102. Other power sources are contemplated such as solar, ambient electromagnetic sources (such as inductive power), kinetic, etc. The power source can be rechargeable but this is not required. For example, electronic device 100 can be designed such that it can utilize a low power state in order to preserve energy so as to last multiple months or years on a single battery.

Electronic device 100 can have various sensors such as inertial measurement unit (IMU) 104 which can house accelerometer(s), gyroscope(s), and/or magnetometer(s). The sensors can include temperature sensor 112, barometer 114, a light sensor, a motion sensor, a proximity sensor, a camera, weight sensor, etc. In some embodiments, electronic device 100 can utilize a weight sensor (e.g., a sensor that determines the amount of weight placed on a respective pallet) to determine when a load has been placed on or removed from the respective pallet. Electronic device 100 can connect to sensors external to electronic device 100 that are located on different parts of the respective pallet. For example, each of the four principle corners of the pallet can include an inertial measurement unit. This can be beneficial because stresses that occur at one area may not occur in another. For example if a pallet is dropped on one corner, a sensor on that corner may be able to detect the full force of the collision, while the effect of the collision may be dampened at the other corners.

Electronic device 100 can include various interfaces. It can include wired interface 122. Wired interface 122 can be engaged by plugging in a device into electronic device 100 (e.g., using a port on electronic device 100). Wired interface can be engaged using specially placed contact pads or wires on the respective pallet to enable a connection when the pallet is in a certain position or location. For example, a wired interface can be engaged by the forks of a forklift, providing the forklift and/or the forklift operator with details of the goods that are on the pallet (e.g., identity and care instructions). Electronic device 100 can include one or more wireless interfaces $116_a$, $116_b$, and 116 (individually or collectively, "wireless interface 116"). Wireless interfaces 116 can use various technologies and protocols (e.g., NFC, RFID, Bluetooth, Zigbee, 802.11/WIFI, WiMax, microwave, cellular protocols, satellite protocols, GPS, LoRa, Sigfox, Ultra Narrow Band, etc.). Electronics device 100 can choose which wireless interface 116 to use based on energy, power, connection distance, and/or regulatory priorities. For example, electronic device 100 can use wireless interface $116_a$ for connecting using NFC or some other local wireless interface to communicate with a nearby device at a low power mode; such a connection may even require little or no power (e.g., using power of the nearby device to power wireless device $116_a$).

Electronic device 100 can use wireless interface $116_b$ for mid-range wireless connections. For example, wireless interface $116_b$ can communicate over WiFi, Low Power Wide Area Network (LPWAN), and/or cellular. This can be useful when electronic device 100 is within a warehouse or in-transit through a location with sparse wireless network coverage. Electronics device 100 can use wireless interface 116 for communicating with a satellite or another receiver a great distance away. As goods are shipped around the world, regional communication methods may be unavailable. A long-range wireless interface such as wireless interface $116_c$ can be useful, for example, while the respective pallet is in the ocean.

Wireless interface 116 can be utilized to communicate to cloud resources (e.g., network resources that are accessible via the Internet), the Internet, local user interfaces (e.g., an operator's phone), other electronic devices 100 (e.g., other electronic devices 100 embedded in neighboring pallets), sorting machines, warehouse trackers, servers, etc. In some embodiments, the signals produced by or received at wireless interface 116 can be utilized for triangulation to determine the location of electronic device 100 within an intermodal container, train, vessel, warehouse, factory, etc.

In some embodiments, electronic device 100 can receive data over wireless interface 116; for example it can receive data associated with the goods on the respective pallet (identification numbers, transit history before being placed on the pallet, destination address, ownership information, handling instructions, etc.). This data can be stored in memory 106. Electronic device 100 can provide direct access to memory 106 through wireless interface 116. Alternatively or additionally, electronic device 100 can validate an external requestor and selectively provide access to memory 106.

CPU 110 can have various low power states. For example, CPU 110 can enter a sleep state (e.g., turning down or off certain clocks) in between communications or events. CPU 110 can set wake events so that when those events occur, it will resume a normal power state. An example wake event can include a wireless signal being received, a certain amount of time elapsing, a sensor exceeding a predetermined threshold, etc.

It should be understood that various components of electronic device 100 can be packaged together. For example, CPU 110 and wireless interface $116_a$ can be a part of a system on chip (SoC) or similar integrated circuit.

Figure 2:
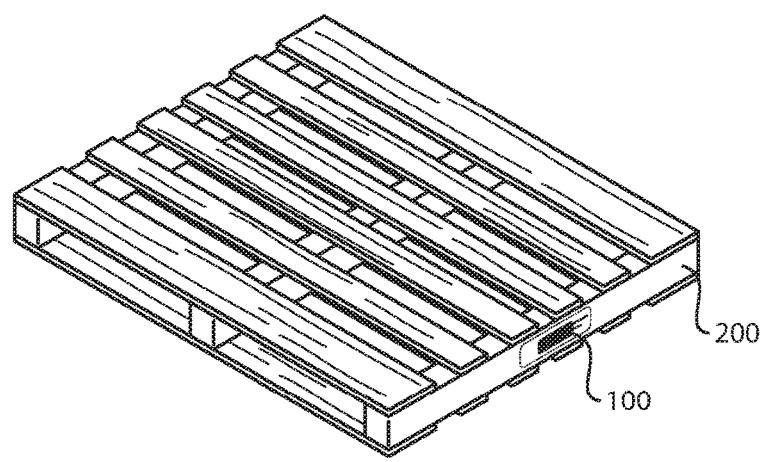
FIG. 2 shows an example pallet embedded with an electronic device.

FIG. 2 shows example pallet 200 with an embedded electronic device 100. One or more electronic devices 100 can be assigned to one pallet 200. For example electronic device 100 can be embedded in a side portion of pallet 200; electronic device 100 can also be embedded in a corner, middle, an alternative side, the top (e.g., load bearing side) or the bottom of pallet 200. For example, pallet 200 can have multiple cross-members supporting a top side; electronic device 100 can be embedded within any of the cross-members. Embedding electronic device 100 in a center cross-member can afford a degree of protection to embedded device 100 while embedding it on an outside cross-member can afford greater accessibility and wireless range. In some embodiments, a portion of election device 100 (e.g., wireless interface 116$_a$) can be embedded within one part of pallet 200 (e.g., an outside cross-member) while another portion (e.g., CPU 110) can be embedded within another part of pallet 200 (e.g., an inside cross-member). Multiple electronic devices 100 in a single pallet 200 can provide redundancy and increased sensor accuracy. Electronic device 100 can be embedded within other types of shipping containers according to the principles herein disclosed.

Figure 3:
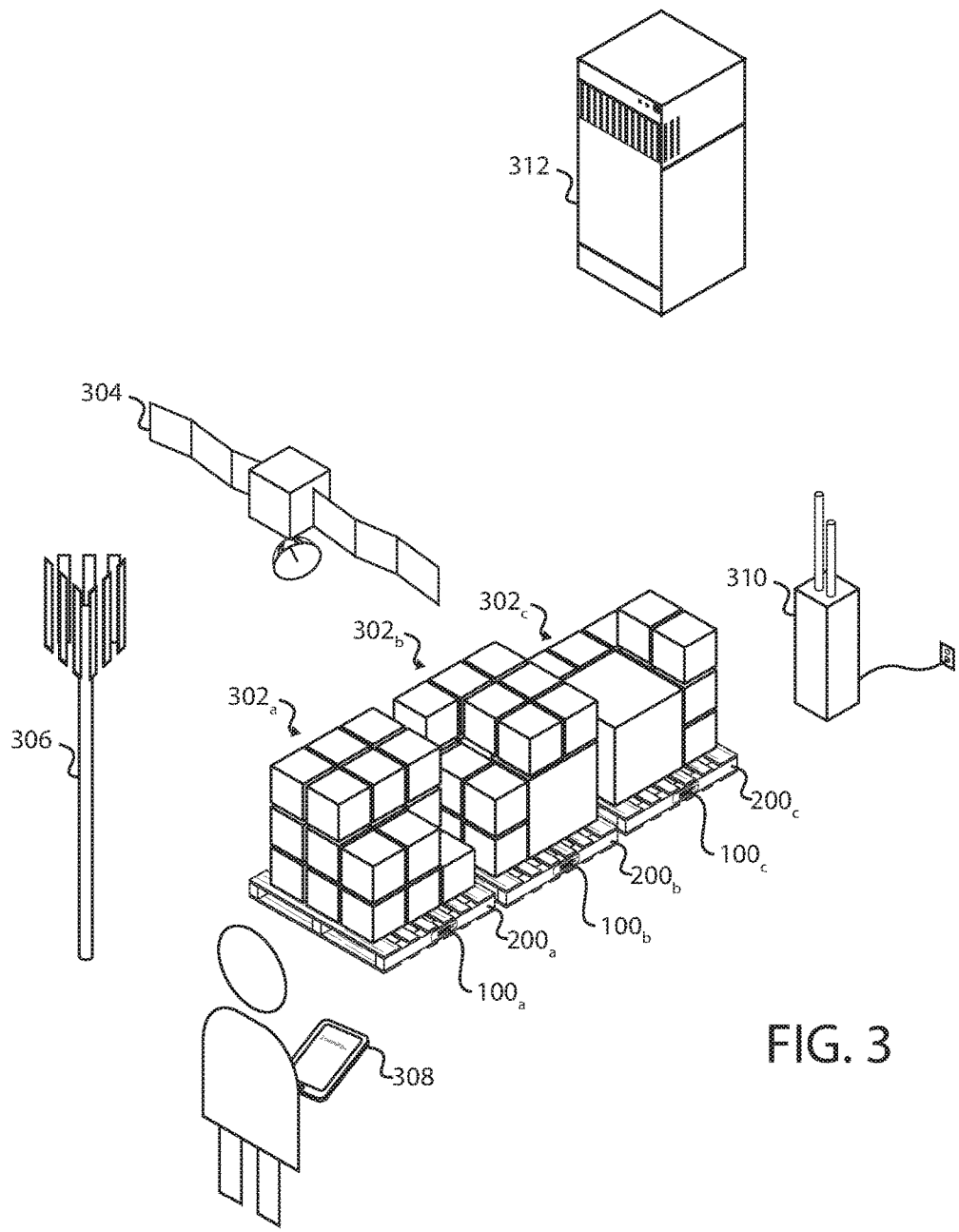
FIG. 3 shows an example configuration of multiple pallets and other devices.

FIG. 3 shows an example configuration of electronic device 100 (e.g., electronic devices 100$_a$, 100$_b$, and 100$_c$) and pallet 200 (e.g., pallets 200$_a$, 200$_b$, and 200$_c$). Load 302 can include items (e.g., consumer goods, raw materials, etc.). Load 302 can include multiple types of items. Load can include a second pallet 200 (and associated second electronic device 100 and second load). Such can occur when pallet 200 is stacked upon the items of another pallet 200.

Electronic device 100 can store in memory 106 associated data such as shipment information. For example, the shipment information can include an identifier for electronic device 100, an identifier for pallet 200, an identifier for load 302, an identifier for goods within load 302 (e.g., an individual identifier for each good within load), etc. Shipment information can include descriptions of electronic device 100, pallet 200, load 302, goods in load 302, etc. Shipment information can include handling instructions (e.g., acceptable accelerations, pressures, temperatures, etc.) for pallet 200, load 302, goods in load 302, etc. Shipment information can include source or destination data, customs data, regulatory information, etc. Shipment information can include ownership information (e.g., contact information, legal information, etc.) for electronic device 100, pallet 200, load 302, goods in load 302, etc. Shipment information can include event data such as location data, if electronic device 100 passed through a "gate" (e.g., a reader in a warehouse), load 302 change data (e.g., weight changes, internal temperature or pressure changes, etc.), collision data (e.g., using IMU 104 to detect a drop or crash), handling data (e.g., what entities or personnel have handled pallet 200, load 302, etc.), ownership change data (e.g., on sale or transfer or responsibility), data connectivity and transmission data, etc. Electronic device 100 can send shipment information to server 312 directly or indirectly. Electronic device 100 can digitally sign shipment information when it gets sent. Electronic device 100 may send shipment information through an intermediary (e.g., another electronic device 100) because electronic device 100 lacks direct connectivity to server 312; later, upon establishing direct connectivity to server 312, electronic device 100 can compare records with server 312 and retransmit any shipment information that was received by server 312.

Electronic device 100 can communicate with satellite 304, cellular tower 306, local wireless device 310, and/or personal electronic device 308 using one or more wireless interfaces 116. For example, electronic device 100 can communicate with satellite 304 using wireless interface 116$_a$, cellular tower 306 using wireless interface 116$_b$, local wireless device 310 using wireless interface 116, and personal electronic device 308 using a fourth wireless interface 116. Connections using wireless interface 116 can be bidirectional or unidirectional. For example, electronic device 100 can have a unidirectional connection with satellite 304 using wireless interface 116$_a$ whereby electronic device can receive location data; electronic device can then transmit such location data using wireless interface 116$_b$ to cellular tower 306. Electronic device 100 can periodically send status messages using a unidirectional (or bidirectional) connection on wireless interface 116. Electronic device 100 can receive a control signal using a unidirectional (or bidirectional) connection on wireless interface 116. For example, electronic device 100 can receive an instruction to communicate with satellite 304, cellular tower 306, local wireless device 310, or personal electronic device 308.

Local wireless device 310 can be a wireless access point (e.g., for 801.11x standards) or a wireless device for any other protocol (e.g., Bluetooth, RFID, Zigbee, etc.). Personal electronic device 308 can be a tablet, cellular phone, inventory scanner, etc. Similarly, personal electronic device 308 can communicate with electronic device 100 using a variety of protocols (e.g., 802.11x, Bluetooth, RFID, Zigbee, etc.). In some embodiments, wireless interface 116 can be an infrared communicator and personal electronic device 308 can have a complimentary infrared communicator for communicating using infrared signals.

At least one of satellite 304, cellular tower 306, personal electronic device 308 and local wireless device 310 can provide access to server 312. This access can be direct (e.g., local wireless device 310 can be connected with a wire to server 312). This access can be additionally or alternatively through the Internet. In some embodiments, at least one of satellite 304, cellular tower 306, personal electronic device 308, and local wireless device 310 can interpret data received from electronic device 100. For example, personal electronic device 308 can communicate with electronic device 100$_a$, electronic device 100$_b$, and electronic device 100$_c$. Personal electronic device 308 can then, based on these communications determine that, for example, electronic device 100$_b$ has a status update that should be reported (e.g., a change in the respective load or a report that pallet 200$_b$ has moved). Personal electronic device 308 can send to server 312 only the status update that needs to be reported. Other ways of interpreting, validating, or selectively relaying information to server 312 are contemplated.

Although certain benefits are available by connecting to server 312, it should be understood that electronic device 100 can connect to personal electronic device 308, local wireless device 310, etc. directly and without external connections (i.e., without connecting to the Internet). For example, personal electronic device 308 can communicate directly with electronic device 100 even if external connectivity is unavailable or not used. This can allow personal electronic device 308 to read the status of electronic device 100 or its associated load.

In some embodiments, multiple electronic devices 100 can intercommunicate in a mesh network. For example, electronic device 100$_c$ can connect to local wireless device 310; electronic device 100$_b$ can then connect to electronic device 100$_c$ and electronic device 100$_a$ can connect to electronic device 100$_b$. These connections can be of the same protocol or different protocols. Thus configured, electronic device 100$_a$ can connect to local wireless device 310 through electronic device 100$_b$ and electronic device 100$_c$. In some embodiments, multiple electronic devices 100 can intercommunicate and establish a shared ledger (e.g., containing electronic devices' 100 shipment information). This shared ledger can be digitally signed by multiple electronic devices 100 in order to validate the data within. The ledger can contain event information and identity information corresponding to one or more of the associated electronic devices 100.

In some embodiments, electronic device 100 can retain the shared ledger or other data associated with another electronic device. For example, electronic device $100_a$ can be close to electronic device $100_b$ while they are at a location with limited connectivity (e.g., in a location with limited wireless connectivity because of interference, in a remote location, etc.). Electronic device $100_a$ can communicate some relevant data (e.g., status information or identity information) to electronic device $100_b$) to electronic device $100_b$. Electronic device $100_b$ might then get transported to a location with better connectivity (e.g., close to portable electronic device 308). Electronic device $100_b$ can then retransmit the data it has stored associated with electronic device $100_a$.

After transmitting the data to server 312 (e.g., via portable electronic device 308 or satellite 304 or cell tower 306), electronic device 100 can delete data it had previously received from other electronic devices 100. In some embodiments, data from one electronic device 100 can be stored on another electronic device 100 for a limited amount of time. For example, after 10 days, the data can be deleted. In some embodiments, data is only allowed to be retransmitted a limited number of times between electronic devices 100. For example, after 8 "hops" the final electronic devices 100 can cease retransmitting the data. Other techniques are contemplated to maximize the possibility of data ultimately reaching server 312 while minimizing the resources required by electronic devices (e.g., memory 106 size, wireless interface 116 bandwidth, and battery size 102) and preventing exponential reproduction of data across the mesh network. In some embodiments, the mesh network is established by electronic devices 100 broadcasting their current accessibility (e.g., the network components such as server 312 that the electronic device 100 can access) as well as predicted future accessibility (e.g., electronic device 100 can determine that pallet 200 will be delivered at a location nearby cellular tower 306 in two days). Electronic devices 100 can take into account current and predicted accessibility when making decisions for routing data within the mesh network.

Some devices may benefit from receiving shipment information from electronic device 100. For example, an operator can utilize personal electronic device 308 to view the status or history of electronic device 100 (and/or of the associated pallet 200, load 302, goods, etc.). Local wireless device 310 can also benefit from receiving the shipment information from electronic device 100; for example, local wireless device 310 can instruct an operator or a machine where to move an associated pallet 200. For example, an operator (or autonomous machine) can engage pallet 200 and, using shipment information received from local wireless device 310, determine the correct location (e.g., a particular area of a warehouse, a certain truck, etc.) for placing pallet 200.

In some embodiments, a device can use shipment information from electronic device 100 (e.g., portable electronic device 308 can present a graphical user interface for an operator representing shipment information) as well as retransmit the shipment information (e.g., to server 312). Alternatively, shipment information can be sent to server 312 and a device can then access such data directly (e.g., using an API).

The techniques herein disclosed (e.g., mesh networking, delayed transmission of data, etc.) can be applied to situations wherein electronic device 100 sends shipment information to server 312 as well as situations where server 312 sends data to electronic device 100. For example, server 312 can send updated ownership information to electronic device $100_a$ via electronic device $100_b$. When electronic device 100 receives a transmission from server 312, it can validate the transmission to determine whether it actually came from server 312. For example, server 312 can sign the transmission with a private key and then electronic device 100 can verify the signature using a known public key.

Figure 4:
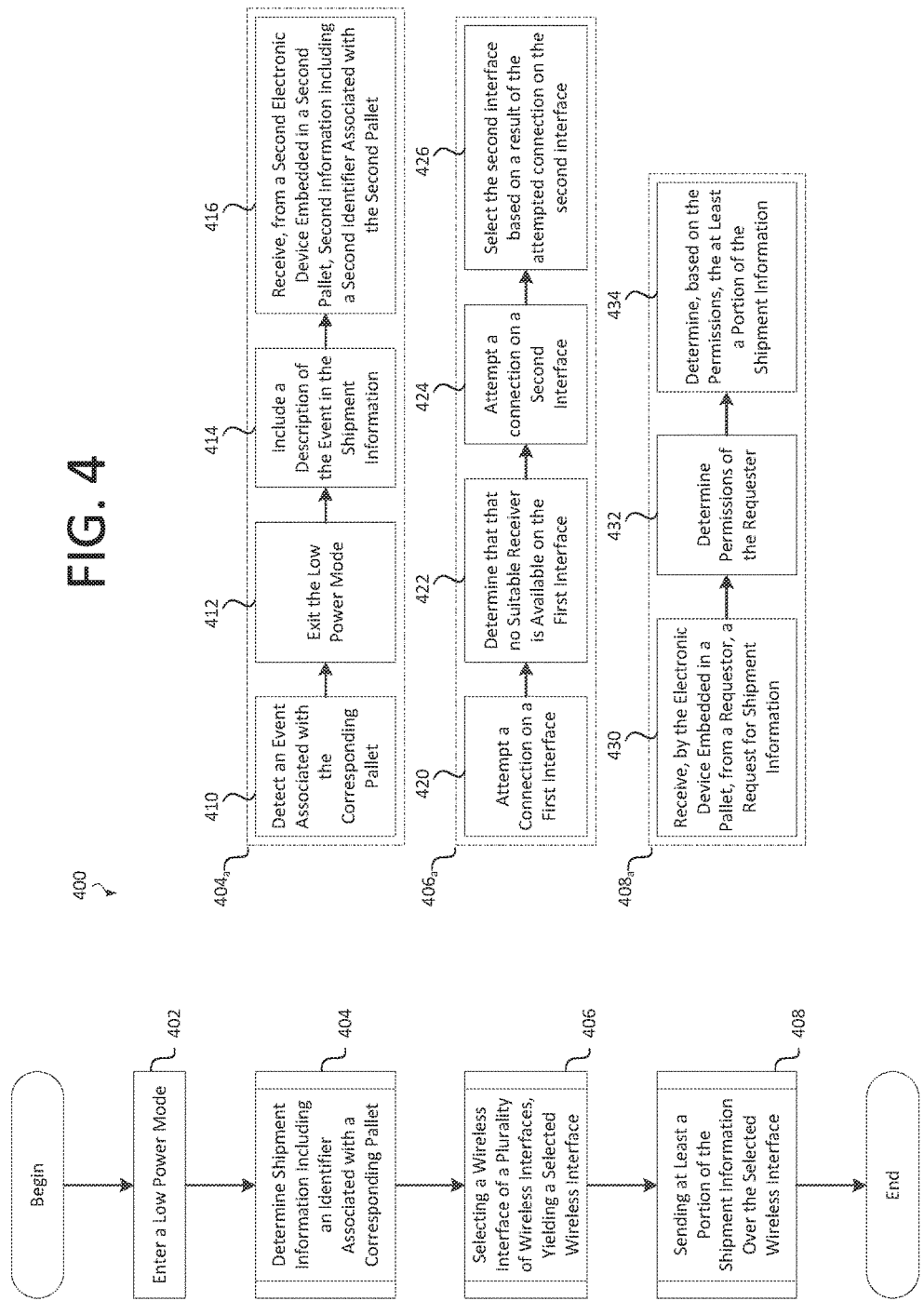
FIG. 4 shows an example method according to some embodiments.

FIG. 4 shows example method 400 according to some embodiments. Example method 400 can be performed by electronic device 100 which can begin and enter a low power mode 402. Low power mode can mean that CPU 110 has powered down the majority of its processing areas and has set a wakeup interrupt. The low power mode can be a default mode for electronic device 100. In some embodiments, the low power mode can be set to only wake up upon the occurrence of a specified event (e.g., a message being received from wireless interface 116 or IMU 104 reporting motion).

A device performing example method 400 can continue and determine shipment information including an identifier associated with a corresponding pallet (step 404). As described above, shipment information can include identity, ownership, activity, event, and/or other information associated with electronic device 100, its corresponding pallet 200, load 302, goods in load, etc.

Shipment information can be determined by receiving it from a sender (e.g., server 312, or personal electronic device 308) as may be the case if electronic device 100 is programmed with shipment information (e.g., identifiers of the associated load 302). Shipment information can be acquired from sensors connected to electronic device 100. In some embodiments, determining shipment information includes detecting information associated with load 302 or goods in load. For example, electronic device 100 can use wireless interface 106 to read information stored in electronic chips attached to various goods contained in load 302. For example electronic device 100 can read RFID tags to determine the contents of load 302.

Step 404 can include method $404_a$. For example, a device performing step 404 can detect an event associated with the corresponding pallet (step 410). For example, the event can be pallet 200 entering a location, passing through a gate, being scanned, moved, dropped, mishandled, exceeding a threshold temperature range (e.g., for more than an allowable time), exceeding a threshold pressure (e.g., a minimum or maximum pressure), having a certain amount of time elapse, or any other event.

The device performing method $404_a$ can then exit the low power mode (step 412). For example, the event in step 410 can be set as an interrupt that activates CPU 110 so that the majority of CPU 110 is active.

The device performing method $404_a$ can then include a description of the event in the shipment information (step 416). For example, the device can store such a description in memory 106. In some embodiments, the description includes the amount of acceleration experienced, the temperature, or any other description. The device can have a clock and can indicate a timestamp along with the description.

The device performing method $404_a$ can then receive, from a second electronic device embedded in a second pallet, second information including a second identifier associated with the second pallet (step 416). For example, referring to FIG. 3 electronic device $100_a$ can receive an identifier from electronic device $100_b$, an identifier associated with pallet $200_b$; this identifier can be assigned to electronic device $100_b$, pallet $200_b$, load $302_b$, etc. Step 416 can include receiving such information over wireless interface 116. In some embodiments, such information can be received over wired interface 122; for example, electrical contacts can become aligned and form a connection when two pallets 200 are stacked or placed next to each other.

Following step 404, a device performing example method 400 can continue and select a wireless interface of a plurality of wireless interfaces, yielding a selected wireless interface (step 406). This wireless interface can be wireless interface 116. Step 406 can include method 406$_a$. The device performing method 406$_a$ can attempt a connection on a first interface (step 420). For example, electronic device 100 can attempt a connection on wireless interface 116$_a$. Wireless interface 116, can utilize Bluetooth Low Energy protocol or some other low power wireless technology.

The device can continue and determine that no suitable receiver is available on the first interface (step 422). For example, local wireless device 310 and personal electronic device 308 can be out of range. Alternatively, a receiver (e.g., local wireless device 310 or electronic device 308) may be available but is otherwise unavailable because it lacks sufficient credentials, does not have bandwidth or storage space to receive data, etc.

The device can continue and attempt a connection on a second interface (step 424). For example, electronic device can attempt a connection on wireless interface 116$_b$ which can be associated with a longer range or higher power protocol (e.g., cellular or satellite). The device can then select the second interface based on a result of the attempted connection on the second interface (step 426). For example, if the connection is available, it can be selected.

The device can continue after step 406 and send at least a portion of the shipment information over the selected wireless interface (step 408). The at least a portion of the shipment information can include an identifier for electronic device 100, pallet 200, load 302, goods in load, etc. Step 408 can include method 408$_a$.

A device performing method 408$_a$ can begin and receive, by the electronic device embedded in a pallet, from a requestor, a request for shipment information (step 430). This can include a request received over wireless interface 116 or wired interface 122. The requestor can be a human operator, a machine in a warehouse, a corporation, server 312 (e.g., a management server that monitors various electronic devices 100), etc. It should be understood that the steps of example method 400 can be performed in any logical order; for example, step 430 can be performed prior to step 404.

The device can then determine permissions of the requestor (step 432). For example, the requestor may be associated with certain access privileges based on the requestor's identity. Thus, step 432 can include determining an identity of the requestor and determining a class of permissions (e.g., a group) associated with the identity. Step 432 can include comparing the identity of the requestor with permissions stored in memory 106. This can include validating a certificate or other credentials of the requestor. The requestor can be a handler, owner, originator, receiver, lessee, common carrier, customs official (or agency), law enforcement official (or agency), nearby electronic device 100, etc.

The device can then determine, based on the permissions, the at least a portion of the shipment information (step 434). For example, the permissions of the requestor that are determined in step 432 can be associated with types of data that are accessible for the requestor. For example, an owner may have full access to all shipment information, a carrier might only have access to handling information, a customs agent may have access to the identity and origin of associated goods, an escrow agent may only have access to verification information, etc. In some embodiments, the requestor can provide a password that is effective to decrypt the portion of the shipment information (e.g., the password can be a decryption key). In some embodiments, groups, classes, or characteristics of people are granted access to a particular portion of the shipment information while other groups, classes, or characteristics of people are granted access to another particular (not necessarily exclusive) portion of the shipment information. If a person satisfies multiple access criteria, the portion of the shipment information can be a combination of sub-portions associated with each criterion.

In some embodiments, various checks can ensure that the requestor should be allowed access to the at least a portion of the shipment information. For example, a worker at a warehouse may be provided with credentials to access a subset of the shipment information. Electronic device 100 can limit the worker's credentials such that they are only valid when electronic device 100 is within or near the associated warehouse. In some embodiments, the credentials are only valid after or before a certain time. The credentials can be only valid after other credentials have been used by a requestor (e.g., a mail carrier can access electronic device 100 and only after mail carrier is a requestor can a customer access electronic device 100). In some embodiments, credentials are only valid when in combination with other credentials; for example, two employees must be requestors at the same time for shipment information to be provided.

Electronic device 100 can receive handling instructions that it must be kept within a specified temperature range (e.g., if the respective goods are perishable food); electronic device 100 can then detect, using temperature sensor 112, when the temperature is close to exiting (or has exited) the specified range. If the respective pallet is in an intermodal container with temperature controls, electronic device 100 can then send a message to the intermodal container (e.g., using wireless interface 116) so that the intermodal container can adjust the temperature appropriately.

Electronic device 100 can detect, using IMU 104, that pallet 200 is not sufficiently parallel with the ground. Electronic device 100 can then notify (e.g., using wireless interface 116, a light, or a speaker connected to electronic device 100) an operator to remedy the situation.

Electronic device 100 can detect that pallet 200 is being mishandled (e.g., dropped). Electronic device 100 can then save the location of pallet 200 (e.g., using triangulated coordinates, detected nearby devices, etc.). Electronic device 100 can then send a message using wireless interface 116 to interested parties. For example, electronic device 100 could cause a text message to be sent to an owner. When pallet 200 is received and the associated goods are inspected, a worker can consult a record stored on electronic device 100 to determine the cause of any damage that occurred.

In some embodiments, electronic device 100 can contain an "asking price" at which the original buyer would be willing to relinquish control of pallet 200 while in transit. For example, a certain material might be in route to buyer A; buyer B may determine that they have a significant need for the material and are willing to pay double for the material. Buyer A can state a price at which it would sell the material and buyer B can submit a request to a handler or common carrier asking if the material is available in transit for the specified price. The handler or common carrier can consult electronic device 100 to determine electronic device's associated goods and asking price and initiate the transaction accordingly.

In some embodiments, electronic device 100 can contain authenticated customs information. For example, a trusted customs agent in one country can certify the contents of load 302 as pallet 200 passes through the country. This certification can include signing a ledger in electronic device 100. A customs agent in another location (e.g., a different part of a building, dock, nation, etc.) can then quickly scan electronic device and determine that another customs agent has certified the contents of load 302 and determine that load 302 has not been tampered with. Electronic device 100 can (e.g., using IMU 104) determine that load 302 has not been tampered with. The authenticated ledger can contain customs declaration information.

In some embodiments, electronic device 100 can predict the structural integrity of pallet 200. For example, electronic device 100 can detect that pallet 200 has been given heavy loads 302 and has been placed in hot and humid environments. Electronic device can then determine that pallet 200 may have less structural integrity than a pallet 200 in better conditions.

In some embodiments, a network of multiple electronic devices 100 can comprise electronic devices of varying capabilities. For example, a network of 10 electronic devices 100 can include 9 electronic devices with small batteries 102 and only short-range wireless interfaces 116. One electronic device 100 in the network can have greater power and longer-range wireless interface 116. Thus configured, the lower-power electronic devices 100 can send communications to the high powered electronic device 100 for retransmission to the internet, server 312, or any other endpoint.

Figure 5A:
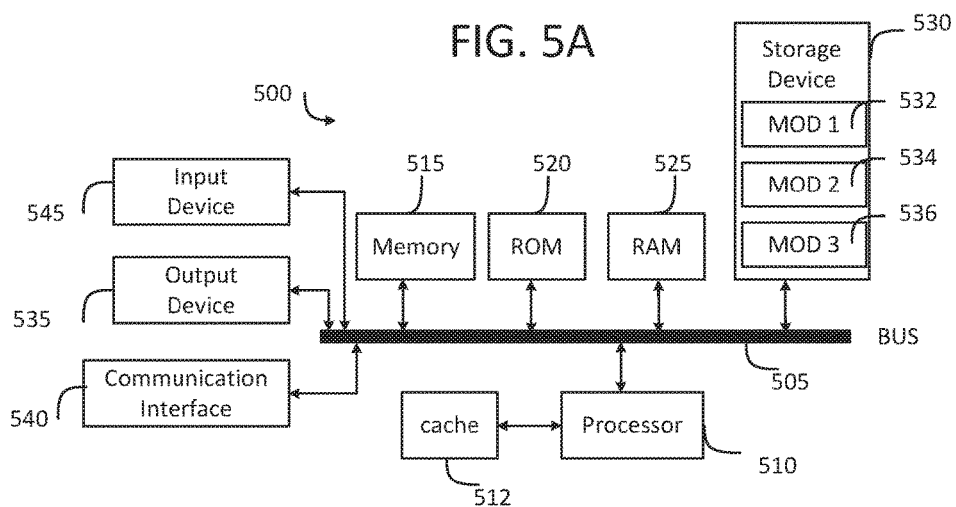
FIG. 5A and FIG. 5B illustrate exemplary possible system embodiments.
Figure 5B:
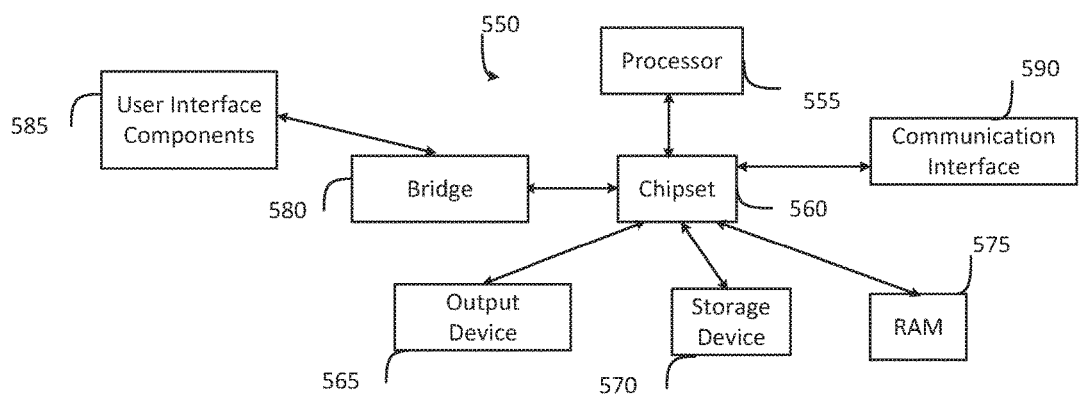

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   initiating, by an electronic device attached to a pallet, a low power mode during which at least one processing area of the electronic device is powered down;
   while the electronic device is operating in the low power mode, determining that a triggering event has occurred, wherein determining that the triggering event has occurred comprises:
      comparing data gathered by a sensor to a threshold, yielding a comparison; and
      determining, based on the comparison, that the threshold has been met or exceeded;
   in response to determining that the triggering event occurred:
      exiting the low power mode, causing the at least one processing area of the electronic device to power up;
      recording sensor data gathered from one or more sensors attached to the pallet in shipment information stored by the electronic device, the shipment information including a description of the triggering event and an identifier associated with the pallet;
      receiving, from a second electronic device attached to a second pallet, second shipment information gathered by sensors of the second electronic device;
      connecting to a receiver via a wireless interface of a plurality of wireless interfaces, yielding a selected wireless interface; and
      sending at least a portion of the shipment information and the second shipment information over the selected wireless interface, the portion of the shipment information including the description of the triggering event; and
   after sending the at least the portion of the shipment information and the second shipment information over the selected wireless interface, reinitiating low power mode during which the at least one processing area of the electronic device is powered down.

2. The method of claim 1, wherein the triggering event is a predetermined time interval being met or exceeded.

3. The method of claim 1, wherein the triggering event is determined based on a score determined from sensor data gathered from at least a first one of the one or more sensors attached to the pallet exceeding a predetermined threshold score.

4. The method of claim 1, wherein determining that a triggering event has occurred comprises:
   receiving, from a first motion sensor of the electronic device, motion data describing a detected physical a movement of the pallet; and
   determining, based on the motion data, that an intensity level of the detected physical movement meets or exceeds a threshold intensity level.

5. The method of claim 1, wherein the at least a portion of the recorded sensor data is sent over the wireless interface using a first Application Programing Interface (API) associated with a management software.

6. The method of claim 1, wherein the recorded sensor data includes identifiers associated with items placed on the pallet.

7. The method of claim 1, wherein connecting to the receiver via the wireless interface comprises:
   attempting to connect to the receiver via a first wireless interface, yielding a first attempt, wherein the first wireless interface uses a first radio setting and provides a first connectivity range;
   determining that the first attempt to connect via the first wireless interface was unsuccessful; and in response to determining that the first attempt was unsuccessful, attempting to connect via a second wireless interface, yielding a second attempt, wherein the second wireless interface uses a second radio setting that is different than the first radio setting and provides a second connectivity range that is different than the first connectivity range.

8. An electronic device attached to a pallet, the electronic device comprising:
one or more computer processors; and
one or more computer-readable mediums storing instructions that, when executed by the one or more computer processors, cause the electronic device to perform operations comprising:
initiating, by an electronic device attached to a pallet, a low power mode during which at least one processing area of the electronic device is powered down;
while the electronic device is operating in the low power mode, determining that a triggering event has occurred, wherein determining that the triggering event has occurred comprises:
comparing data gathered by a sensor to a threshold, yielding a comparison; and
determining, based on the comparison, that the threshold has been met or exceeded;
in response to determining that the triggering event occurred:
exiting the low power mode, causing the at least one processing area of the electronic device to power up;
recording sensor data gathered from one or more sensors attached to the pallet in shipment information stored by the electronic device, the shipment information including a description of the triggering event and an identifier associated with the pallet;
receiving, from a second electronic device attached to a second pallet, second shipment information gathered by sensors of the second electronic device;
connecting to a receiver via a wireless interface of a plurality of wireless interfaces, yielding a selected wireless interface; and
sending at least a portion of the shipment information and the second shipment information over the selected wireless interface, the portion of the shipment information including the description of the triggering event; and
after sending the at least the portion of the shipment information and the second shipment information over the selected wireless interface, reinitiating low power mode during which the at least one processing area of the electronic device is powered down.

9. The electronic device of claim 8, wherein the triggering event is a predetermined time interval being met or exceeded.

10. The electronic device of claim 8, wherein the triggering event is determined based on a score determined from sensor data gathered from at least a first one of the one or more sensors attached to the pallet exceeding a predetermined threshold score.

11. The electronic device of claim 8, wherein determining that a triggering event has occurred comprises:
receiving, from a first motion sensor of the electronic device, motion data describing a detected physical a movement of the pallet; and
determining, based on the motion data, that an intensity level of the detected physical movement meets or exceeds a threshold intensity level.

12. The electronic device of claim 8, wherein the at least a portion of the recorded sensor data is sent over the wireless interface using a first Application Programing Interface (API) associated with a management software.

13. The electronic device of claim 8, wherein the recorded sensor data includes identifiers associated with items placed on the pallet.

14. The electronic device of claim 8, wherein connecting to the receiver via the wireless interface comprises:
attempting to connect to the receiver via a first wireless interface, yielding a first attempt, wherein the first wireless interface uses a first radio setting and provides a first connectivity range;
determining that the first attempt to connect via the first wireless interface was unsuccessful; and
in response to determining that the first attempt was unsuccessful, attempting to connect via a second wireless interface, yielding a second attempt, wherein the second wireless interface uses a second radio setting that is different than the first radio setting and provides a second connectivity range that is different than the first connectivity range.

15. A non-transitory computer-readable medium storing instructions that, when executed by one or more computer processors of an electronic device attached to a pallet, cause the electronic device to perform operations comprising:
initiating, by an electronic device attached to a pallet, a low power mode during which at least one processing area of the electronic device is powered down;
while the electronic device is operating in the low power mode, determining that a triggering event has occurred, wherein determining that the triggering event has occurred comprises:
comparing data gathered by a sensor to a threshold, yielding a comparison; and
determining, based on the comparison, that the threshold has been met or exceeded;
in response to determining that the triggering event occurred:
exiting the low power mode, causing the at least one processing area of the electronic device to power up;
recording sensor data gathered from one or more sensors attached to the pallet in shipment information stored by the electronic device, the shipment information including a description of the triggering event and an identifier associated with the pallet;
receiving, from a second electronic device attached to a second pallet, second shipment information gathered by sensors of the second electronic device;
connecting to a receiver via a wireless interface of a plurality of wireless interfaces, yielding a selected wireless interface; and
sending at least a portion of the shipment information and the second shipment information over the selected wireless interface, the portion of the shipment information including the description of the triggering event; and
after sending the at least the portion of the shipment information and the second shipment information over the selected wireless interface, reinitiating low power mode during which the at least one processing area of the electronic device is powered down.

16. The non-transitory computer-readable medium of claim 15, wherein the triggering event is a predetermined time interval being met or exceeded.

17. The non-transitory computer-readable medium of claim 15, wherein the triggering event is determined based on a score determined from sensor data gathered from at least a first one of the one or more sensors attached to the pallet exceeding a predetermined threshold score.

18. The non-transitory computer-readable medium of claim 15, wherein determining that a triggering event has occurred comprises:
   receiving, from a first motion sensor of the electronic device, motion data describing a detected physical a movement of the pallet; and
   determining, based on the motion data, that an intensity level of the detected physical movement meets or exceeds a threshold intensity level.

19. The non-transitory computer-readable medium of claim 15, wherein the at least a portion of the recorded sensor data is sent over the wireless interface using a first Application Programing Interface (API) associated with a management software.

20. The non-transitory computer-readable medium of claim 15, wherein the recorded sensor data includes identifiers associated with items placed on the pallet.

* * * * *